United States Patent Office 3,641,246
Patented Feb. 8, 1972

3,641,246
COMPOSITIONS FOR INHIBITING ANOMALOUS DEPOSITION AND MOBILIZATION OF CALCIUM PHOSPHATE IN ANIMAL TISSUE
Marion D. Francis, Springfield Township, Hamilton County, Ohio, assignor to The Procter & Gamble Company, Cincinnati, Ohio
No Drawing. Continuation-in-part of application Ser. No. 709,870, Mar. 4, 1968. This application Jan. 14, 1970, Ser. No. 2,960
Int. Cl. A61k 27/00
U.S. Cl. 424—204
12 Claims

ABSTRACT OF THE DISCLOSURE

Compositions for inhibiting anomalous deposition and mobilization of calcium phosphates in animal tissue, comprising an effective amount of certain perfluorodiphosphonocycloalkenes and a pharmaceutical carrier; and a method for treating conditions involving pathological calcification and hard tissue demineralization in an animal comprising administering to such animal said compositions.

CROSS-REFERENCE TO RELATED APPLICATIONS

This application is a continuation-in-part of the copending patent application of Marion D. Francis, Ser. No. 709,870, filed Mar. 4, 1968, now abandoned.

BACKGROUND OF THE INVENTION

This invention relates to novel compositions having therapeutic and/or prophylactic effects. The invention further relates to a novel method for treating or preventing certain pathological conditions in animals.

A number of pathological conditions which can afflict warm-blooded animals involve abnormal calcium and phosphate metabolism. Such conditions may be divided into two broad categories.

(1) Conditions which are characterized by anomalous mobilization of calcium and phosphate leading to general or specific bone loss or excessively high calcium and phosphate levels in the fluids of the body. Such conditions are sometimes referred to herein as pathological hard tissue demineralizations.

(2) Conditions which cause or result from deposition of calcium and phosphate anomalously in the body. These conditions are sometimes referred to herein as pathological calcifications.

The first category includes osteoporosis, a condition in which bone hard tissue is lost disproportionately to the development of new hard tissue. Marrow and blood spaces become larger, fibrous binding decreases, and compact bone becomes cancellous and fragile. Osteoporosis can be subclassified as menopausal, senile, drug induced (e.g., adrenocorticoid as can occur in steroid therapy), disease induced (e.g., arthritic and tumor), etc., however, the manifestations are essentially the same. Another condition in the first category is Paget's disease (osteitis deformans) which is also characterized by bone loss. In this disease, dissolution of normal bone occurs which is then replaced by soft, poorly mineralized tissue such that the bone becomes deformed from pressures of weight bearing, particularly in the tibia and femur. This conditions also frequently sponsors pathological deposition of calcium and phosphate.

The second category, involving conditions manifested by anomalous calcium and phosphate deposition, includes such afflictions as arthritis, neutritis, bursitis and other inflammatory conditions which predispose involved tissue to deposition of calcium phosphates, and hormonal imbalance, e.g., hyperparathyroidism, myosities ossificans progressiva, calcinosis universalis, resulting in calcification of soft tissues. Atherosclerosis is another condition in this category and involves degeneration and proliferate change in the intima which produces fibrous, lipoid plaques. If such plaques calcify, or if the inner walls of the arteries accumulate plaque and calcify, this condition is commonly referred to as arteriosclerosis.

Yet another condition in category (2) which results from anomalous calcium and phosphate deposition is stone or calculi formation in the bile duct, gall bladder, pancreas, salivary glands, tonsils, kidneys and bladder. Although some of such stones are not comprised primarily of calcium phosphate, it is likely that the original nidus is calcium phosphate. The formation of urinary calculi, i.e., urolithiasis, in cattle and sheep constitutes a major problem in veterinary medicine. It is estimated that from 5% to 10% of weanling calves suffer this affliction when they are taken off milk and start taking in other fluids.

As far as is known, no satisfactory medical treatment for the conditions of category (1) as described above has been developed prior to this invention although dietary control, fluorides, chelators such as EDTA, and the hormone calcitonin (thyrocalcitonin) have been suggested or used for these condtions. Although certain inorganic phosphates such as pyrophosphates and longer chain condensed phosphates have been suggested for treatment of conditions in category (2), they have not been widely used because of their tendency to hydrolyze to the ineffective orthophosphate when administered to larger animals such as humans and cattle.

Various organic polyphosphonates have been shown to be effective in inhibiting anomalous deposition and mobilization of calcium phosphate as is disclosed in the copending application of Marion D. Francis, Ser. No. 775,203, filed Nov. 12, 1968; however, researchers continue to seek effective alternatives.

It is therefore an object of this invention to provide a composition for inhibiting anomalous deposition and mobilization of calcium phosphate in animal tissue.

It is a further object of this invention to provide an improved method for treatment of conditions involving pathological calcification and hard tissue demineralization in animals.

SUMMARY OF THE INVENTION

This invention is based on the discovery that certain perfluoro-1,1-diphosphonocycloalkyl-1-enes and pharmaceutically acceptable salts thereof (referred to collectively herein as "perfluorodiphosphonocycloalkenes") reduce anomalous mobilization and deposition of calcium phosphates in animals. The invention thus involves a composition and method for treating conditions involving pathological demineralization of bony tissue and pathological calcium deposition in the soft tissue of animals. In its method aspect, the invention comprises administering to said animals an effective amount of a perfluoro-1,2-diphosphonocycloalkyl-1-ene as hereinafter characterized.

DETAILED DESCRIPTION OF THE INVENTION

In one of its aspects, this invention is a composition comprising an effective but non-toxic amount of a perfluorodiphosphonocycloalkane selected from the group consisting of those of the formula:

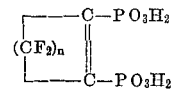

wherein $n$ is an integer from 2 to 4, and the pharmaceutically acceptable salts thereof, such as alkali metal (e.g., sodium and potassium), alkaline earth metal (e.g., calcium and magnesium), non-toxic heavy metal (e.g., stannous and indium), ammonium, or low molecular weight substituted ammonium (e.g., mono-, di-, and triethanolammonium) salts; and a pharmaceutical carrier.

The perfluorodiphosphonocycloalkenes can be prepared, for example, by reacting trialkyl phosphites with 1,2-dichloroperfluorocycloalk - 1-enes in accordance with the procedures fully described by Frank in J. Org. Chem., 31, #5, p. 1521.

The required dosage of perfluorodiphosphonocycloalkene will vary with the particular condition being treated, the severity of the condition, and the duration of treatment; however, single dosages can range from 0.01 to 500 mg. per kilogram of body weight, preferably 0.5 to 50 mg./kg., with up to four dosages daily. The higher dosages within this range are, of course, required in the case of oral administration because of limited absorption. Dosages greater than about 500 mg./kg. may produce toxic symptoms and should be avoided. Moreover, daily dosages greater than about 2000 mg./kg. (unless otherwise specified, the unit designated "mg./kg." as used herein refers to mg./kg. of body weight) are not required to produce the desired effect and may produce toxic side effects. Dosages of less than about .01 mg./kg. do not materially affect pathological calcification or demineralization, even administered intravenously. Table 1 below sets forth preferred dosages for various conditions which can be treated in accordance with this invention.

TABLE 1

| Condition: | Oral dosage (mg./kg.) up to four times/day |
| --- | --- |
| Osteoporosis (menopausal) [1] | 1–25 |
| Osteoporosis (senile et al.) | 1–25 |
| Paget's disease | 10–50 |
| Arthritis | 1–25 |
| Bursitis | 1–25 |
| Neuritis | 1–25 |
| Stones | 1–25 |

[1] A larger initial dosage may be required, e.g., up to 500 mg./kg. followed by the specified dosage levels.

The perfluorodiphosphonocycloalkenes can also be administered parenterally in aqueous solution by subcutaneous, intradermal, intramuscular or intravenous injection. The preferred single dosage ranges by these modes of administration are as follows:

| | Mg./kg. |
| --- | --- |
| Subcutaneous | 0.1–10 |
| Intradermal | 0.1–10 |
| Intramuscular | .05– 5 |
| Intravenous | .05– 5 |

For purposes of oral administration the perfluorodiphosphonocycloalkenes can be formulated in the form of capsules, tablets or granules. For treatment of non-human animals, the perfluorodiphosphonocycloalkenes are preferably incorporated in animal feed, feed supplements or feed concentrates. They can also be prepared in unit dosage form together with a pharmaceutical carrier, each unit dosage form containing from 15 mg. to 10 g. of perfluorodiphosphonocycloalkene. The preferred concentration range of perfluorodiphosphonocycloalkene in unit dosage forms intended for use by humans and smaller domesticated animals is from 15 mg. to 1000 mg., more preferably 100 mg. to 500 mg. A higher concentration range, i.e., from 1 g. to 5 g. is preferred in unit dosage forms intended for treatment of larger animals such as cattle, horses, etc.

When administered orally, the compositions of this invention are preferably in a form adapted to minimal exposure of the perfluorodiphosphonocycloalkenes to the oral cavity. Although these compounds do not damage dental enamel when applied to the tooth surfaces at the relatively low concentrations typical of toothpaste, mouthwash, lozenges and the like intended for dental calculus prophylaxis, the substantially higher concentrations of perfluorodiphosphonocycloalkenes provided in the unit dosage form embodiments of this invention may demineralize dental enamel or repeated prolonged exposure. Thus oral administration is preferably effected with such unit dosage forms as capsules, pills, and tablets which are promptly ingested. Troches, chewable tablets and the like which typically remain in the oral cavity for a substantial time prior to ingestion are preferably avoided.

As used herein, the term "pharmaceutical carrier" denotes a solid or liquid filler, diluent or encapsulating substance. Some examples of the substances which can serve as pharmaceutical carriers are sugars such as lactose, glucose and sucrose; starches such as corn starch and potato starch; cellulose and its derivatives, such as sodium carboxymethylcellulose, ethylcellulose, cellulose acetate; powdered tragacanth; malt; gelatin; talc; stearic acid; magnesium stearate; calcium sulfate; vegetable oils, such as peanut oil, cottonseed oil, sesame oil, olive oil, corn oil and oil of theobroma; polyols such as propylene glycol, glycerin, sorbitol, mannitol, and polyethylene glycol; agar; alginic acid; pyrogen-free water; isotonic saline; and phosphate buffer solutions, as well as other non-toxic compatible substances used in pharmaceutical formulations. Wetting agents and lubricants such as sodium lauryl sulfate, as well as coloring agents, flavoring agents and preservatives, can also be present.

The pharmaceutical carrier employed in conjunction with the perfluorodiphosphonocycloalkenes is used at a concentration sufficient to provide a practical size to dosage relationship. Preferably, the pharmaceutical carrier comprises from about 0.1% to 99% by weight of the total composition.

Animal feed compositions to which the perfluorodiphosphonocycloalkenes of this invention can be added generally include as feedstuffs a cellulosic roughage component such as hay, straw, cottonseed hulls, beet pulp, silage, ground corn cobs, corn stalks, etc. Protein-containing components such as whole grains, including corn, wheat, barley, oats, rye millet and alfalfa; processed grains including cottonseed meal corn meal soybean meal linseed meal and other waste products from the oil expressing industry; animal protein including casein gelatin fish meal and slaughterhouse wastes are also required feedstuffs for a nutritionally balanced feed composition. Animal feed compositions can also contain natural oils including animal fats such as beef tallow mutton tallow; fish oils including eel herring, menhaden, tuna and salmon oil; and whale oil. Vegetable oils such as soybean oil, sunflower oil, olive oil, safflower oil, corn oil, peanut oil, cottonseed oil, rice oil, millet oil, wheat germ oil and palm oil, can also be used.

In addition to the feedstuffs mentioned above, animal feed compositions can include supplemental sources of minerals, such as bone meal, salt, and the various trace minerals, such as salts of zinc, copper, manganese, magnesium, cobalt, iodine and iron. Antibiotics, steroids, anthelmintics and other medicaments or growth stimulating substances can be incorporated in animal feeds. Various vitamins can be added to animal feed compositions to provide for deficiencies incident to the selection of other feed components. Other feedstuffs can be included such as casein, other milk by-products, and synthetic nitrogen sources such as urea.

The perfluorodiphosphonocycloalkenes can be incorporated in the total feed composition as described above or in intermediate feed concentrates or feed supplements which are adapted to be blended with the basic roughage and protein feedstuffs to prepare the final feed. In the feed industry the term "concentrate" is often used to denote a product which contains a relatively large quantity of one or more nutrients, such as high quality protein, minerals, vitamins and the like and which is adapted for addition to the basic feedstuffs to form a total or final feed. The term "supplement" is also used to denote a specific feedstuff or mixture thereof that is either added to or included in the concentrate portion of the total feed, or in the total feed itself. The perfluorodiphosphonocycloalkenes can be employed in accordance with this invention by incorporating same in feed supplements, concentrates or the total feed composition (all referred to hereinafter as "feed compositions"). For the purposes of this invention, the term "pharmaceutical carrier" is intended to encompass feed compositions.

Feed compositions containing a minor proportion of one or more of the prefluorodiphosphonocycloalkenes described herein incorporated in a major proportion of an animal foodstuff constitute a preferred embodiment of this invention inasmuch as they provide an effective and practical means of urolithiasis prophylaxis for large herds of animals, especially during periods of feed-lot maintenance or limited grazing. Urolithiasis prophylaxis can be achieved in grazing herds by incrporating the perfluorodiphosphonocycloalkenes in block salt.

The concentration of perfluorodiphosphonocycloalkene in feed compositions will of course vary with the weight of the animal to be treated and the proportion of the total diet which the feed composition comprises. When herds of animals are to be treated, the level of perfluorodiphosphonocycloalkene in the feed composition should be sufficient to provide the dosages specified herein based on the average feed consumption and weight of the animals. In any event, the perfluorodiphosphonocycloalkenes comprise a minor proportion of the total feed composition.

While it is not intended that this invention be limited by a particular theory of operation, in the case of those conditions which cause or result from deposition of calcium and phosphate anomalously in the body, it is believed that prefluorodiphosphonocycloalkenes interfere with the conversion of X-ray amorphous calcium phosphate to crystalline calcium hydroxylapatite and thus greatly reduce or prevent the formation of calcium phosphate deposits. Although certain inorganic phosphates also inhibit crystal growth, they are hydrolyzed soon after administration to the orthophosphate species which has no crystal growth inhibition properties and, in fact, can itself take part in hydroxylapatite formation. The perfluorodiphosphonocycloalkenes of this invention, on the other hand, are stable to hydrolysis and remain active after administration, even to larger animals such as cattle.

CRYSTAL GROWTH INHIBITION DETERMINATION

The efficacy of perfluorodiphosphonocycloalkenes in inhibiting crystal growth is demonstrated by the crystal growth inhibition determination which is conducted as follows:

1 ml. of a 0.1 M stock solution of $NaH_2PO_4 \cdot H_2O$ is diluted with 22 ml. of distilled water. 1 ml. of an aqueous solution of disodium 3,3,4,4,5,5-hexafluoro-1,2-diphosphonocyclopent-1-ene (HFDC) at a concentration sufficient to provide the desired ultimate concentration in the reaction mixture is added to the diluted $NaH_2PO_4$ solution and the solution is adjusted to pH 7.4 with sodium hydroxide. To this solution is added 1 ml. of a 0.1 M solution of $CaCl_2 \cdot 2H_2O$ pre-adjusted to pH 7.4 with sodium hydroxide. This mixture is held at a constant pH 7.4 throughout the reaction period.

After a sufficient reaction time as determined by the operator, generally within 90 minutes, the solution is filtered through a 0.45 millipore filter pad. The precipitate is air-dried and analyzed by X-ray diffraction. The solid calcium phosphate precipitated from the above-described solution without HFDC gives a typical hydroxylapatite pattern, while the calcium phosphate precipitated under the same conditions but in the presence of small amounts of this representative perfluorodiphosphonocycloalkene is amorphous to X-rays.

Those compounds which are effective in inhibiting the growth of hydroxylapatite crystals at concentrations of less than $1.5 \times 10^{-3}$ M under the conditions of this test are found to inhibit anomalous mobilization and deposition of calcium phosphates in animal tissue, while several compounds outside the scope of this invention that have little or no effect in this test are ineffective in vivo.

When tested in the above-described manner HFDC was found to inhibit crystal growth at a concentration of $1.82 \times 10^{-4}$ M. Similar values are obtained when the other perfluorodiphosphonocycloalkene compounds encompassed by this invention are tested in like manner.

Thus, the presence of $1.82 \times 10^{-4}$ M of HFDC in the test solutions of the crystal growth inhibition test results in the formation of an amorphous calcium phosphate rather than crystalline calcium hydroxylapatite as occurs without HFDC and the total formation of calcium orthophosphate is greatly decreased.

The capacity of perfluorodiphosphonocycloalkenes to inhibit anomalous calcification is also demonstrated in vivo as follows:

This test is based on the observation that massive dosages of vitamin $D_3$ induces extensive calcification in the aorta of rats [see Gillman et al., J. Exp. Path., 40:1 (1960)]. Female Wister rats each weighing 150 to 200 g. are randomly divided into a control group of 60 animals and test groups each containing 10 animals. The animals are kept in a thermostabilized room at 22° C. and receive a normal diet and tap water ad libitum throughout the test period. All of the animals are given daily doses of 75,000 units/kg. of vitamin $D_3$ via stomach tube for five days beginning on the third and ending on the seventh day of the test. Beginning on the first day (prior to the first dosage of vitamin $D_3$) until the conclusion of the test, the test groups of animals are administered specified dosages of perfluorodiphosphonocycloalkenes, orally by stomach tube and subcutaneously, respectively, once per day. In each case the perfluorodiphosphonocycloalkenes are dissolved in 0.9% NaCl when given at the lower dosages, and in distilled water when given at higher dosages. The solution is adjusted to pH 7.4 and the amount of solution given is 2 ml./kg. of body weight. On the fifteenth day, the animals are sacrificed and their aortas are dissected and dried for 48 hours at 120° C. After determination of the dry weight, the aortas are ashed in a muffle oven at 800° C. for six hours. The residue is dissolved in 0.2 N HCl and the calcium is titrated with EDTA using calcichrome as an indicator in a titration photometer, all in accordance with the methods described by Irving et al., Proc. Soc. Exp. Biol. Med., 122, #3, 852 (1966).

The calcium values secured in this test reveal that perfluorodiphosphonocycloalkenes materially reduce vitamin $D_3$-induced calcification in the aorta of rats.

EXAMPLE I

Capsules are prepared by conventional methods, comprised as follows.

| Ingredient: | Mg. per capsule |
| --- | --- |
| Disodium salt of 3,3,4,4,5,5-hexafluoro-1,2-diphosphonocyclopent-1-ene | 350.00 |
| Starch | 55.60 |
| Sodium lauryl sulfate | 2.90 |

The above capsules administered orally twice daily substantially reduces bone decalcification in a patient weighing approximately 70 kilograms afflicted with osteoporosis. Similar results are attained when the dipotassium salt of 3,3,4,4-tetrafluoro-1,2-diphosphonocyclobut-1-ene; the monocalcium salt of 3,3,4,4,5,5,6,6-octafluoro-1,2-diphosphonocyclohex-1-ene; the di(triethanolammonium) salt of 3,3,4,4,5,5-hexafluoro-1,2-diphosphonocyclopent-1-ene; 3,3,4,4-tetrafluoro-1,2-diphosphonocyclobut-1-ene; and 3,3,4,4,5,5,6,6 - octafluoro-1,2-diphosphonocyclohex-1-ene, respectively, are employed in the above-described capsule in place of the disodium salt of 3,3,4,4,5,5-hexafluoro-1,2-diphosphonocyclopent-1-ene.

EXAMPLE II

Tablets are prepared by conventional methods, formulated as follows.

| Ingredient: | Mg. per tablet |
|---|---|
| 3,3,4,4,5,5 - hexafluoro - 1,2 - diphosphonocyclopent-1-ene | 25.00 |
| Lactose | 40.00 |
| Starch | 2.50 |
| Magnesium stearate | 1.00 |

When administered orally four times daily, the above composition significantly reduces the formation of renal calculi in a patient weighing approximately 50 kilograms, having a predisposition to such formation.

Similar results are achieved with tablets formulated as above but replacing 3,3,4,4,5,5-hexafluoro-1,2-diphosphonocyclopent-1-ene with the diammonium salt of 3,3,4,4,5,5-hexafluoro-1,2-diphosphonocyclopent-1-ene; the monocalcium salt of 3,3,4,4-tetrafluoro-1,2-diphosphonocyclobut-1-ene; the distannous salt of 3,3,4,4-tetrafluoro-1,2-diphosphonocyclobut-1-ene; and the indium salt of 3,3,4,4-tetrafluoro-1,2-diphosphonocyclobut - 1 - ene, respectively.

The lactose employed in this example is replaced by sucrose and the magnesium stearate by sodium carboxymethylcellulose without affecting the desired properties of the tablet.

Additional tablet compositions are prepared in accordance with the invention as follows:

| Ingredient | Milligrams per tablet Example | | | | |
|---|---|---|---|---|---|
| | III | IV | V | VI | VII |
| Triammonium salt of 3,3,4,4-tetrafluoro-1,2-diphosphonocyclobut-1-ene | 80.0 | | | | |
| Trisodium salt of 3,3,4,4,5,5,6,6-octafluoro-1,2-diphosphonocyclohex-1-ene | | 100.0 | | | |
| Mono(diethanolammonium) salt of 3,3,4,4,5,5,6,6-octafluoro-1,2-diphosphonocyclohex-1-ene | | | 120.0 | | |
| Distannous salt of 3,3,4,4,5,5,6,6-octafluoro-1,2-diphosphonocyclohex-1-ene | | | | 50.0 | 25.0 |
| 3,3,4,4,5,5-hexafluoro-1,2-diphosphonocyclopent-1-ene | | | | | 25.0 |
| Lactose | 97.0 | 31.0 | 31.0 | 73.0 | 30.0 |
| Starch | 45.0 | 13.0 | 13.0 | 57.0 | |
| Stearic acid | | | | 6.0 | |
| Talc | 35.0 | 6.5 | 6.5 | 9.0 | 5.0 |
| Calcium stearate | | 1.0 | 1.0 | | 1.0 |
| Ethyl cellulose | | 16.0 | 16.0 | | 15.0 |

Solutions for parenteral administration are prepared by dissolving the following phosphonates in distilled water at the specified concentration, adjusting the pH to 7.4 with HCl in the case of the basic salts and the base corresponding to the indicated salt form or sodium hydroxide in the case of the acids, and sterilizing same by standard sterilization techniques.

| Example | Phosphonate | Conc. mg./ml. |
|---|---|---|
| VIII | Disodium salt of 3,3,4,4,5,5-hexafluoro-1,2-diphosphonocyclopent-1-ene. | 10.0 |
| IX | 3,3,4,4,5,5-hexafluoro-1,2-diphosphonocyclopent-1-ene. | 15.0 |
| X | Tripotassium salt of 3,3,4,4,5,5-hexafluoro-1,2-diphosphonocyclopent-1-ene. | 5.0 |
| XI | Triammonium salt of 3,3,4,4,5,5-hexafluoro-1,2-diphosphonocyclopent-1-ene. | 25.0 |
| XII | Trisodium salt of 3,3,4,4,5,5 hexafluoro-1,2-diphosphonocyclopent-1-ene. | 13.0 |

The solutions of the foregoing examples when administered by injection to animals in an amount sufficient to provide recommended dosage levels as hereinbefore specified substantially reduces pathological calcification and hard tissue demineralization. Preferably, the solutions are packaged in 2 ml. sealed ampules for single dosage hypodermic injections.

EXAMPLE XIII

A complete feed composition embodying the present invention is prepared by grinding and mixing the following.

| Component: | Parts by wt. |
|---|---|
| Timothy hay | 960 |
| Dehydrated alfalfa | 40 |
| Yellow corn | 600 |
| Corn starch | 310 |
| Iodized salt | 10 |
| Bone meal | 20 |
| Sea salt | 2 |
| Soybean meal | 30 |
| Biuret | 28 |
| Disodium salt of 3,3,4,4,5,5-hexafluoro-1,2-diphosphonocyclopent-1-ene | .83 |

This composition is fed to 400 pound weanling steers at the rate of approximately 12 pounds per day. The average dosage of disodium salt of 3,3,4,4,5,5-hexafluoro-1,2-diphosphonocyclopent-1-ene effected in this manner is about 1.8 g. per day. Animals placed on this feed experience a substantially lower incidence of urolithiasis than control animals receiving the same feed but without the polyphosphonate salt.

EXAMPLE XIV

A supplementary feed concentrate is prepared by intimately admixing the following.

| Component: | Parts by wt. |
|---|---|
| Biuret | 400 |
| Brewer's dried grains | 25 |
| Dehydrated alfalfa | 43 |
| Iodized salt | 10 |
| Tricalcium phosphate | 2 |
| 3,3,4,4,5,5-hexafluoro - 1,2 - diphosphonocyclopent-1-ene | 4 |

This composition is suitable for mixing with silage, grain, hay, ground grain and the like for preparing total feed compositions for ruminant livestock. When fed as a supplement to legumes consumed by grazing weanling lambs at the rate of 0.25 pound per day, this supplement greatly reduces the incidence of urolithiasis.

What is claimed is:

1. A composition in unit dosage form for inhibiting deposition and mobilization of calcium phosphate in animal tissue comprising (1) an effective but non-toxic amount, within the range from about 15 milligrams to 1000 milligrams, of a perfluorodiphosphonocycloalkene selected from the group consisting of:

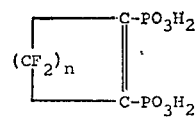

whereinin $n$ is an integer from 2 to 4, and the pharmaceutically acceptable salts thereof, and (2) a pharmaceutical carrier.

2. The composition of claim 1 wherein the perfluorodiphosphonocycloalkene is 3,3,4,4,5,5 - hexafluoro-1,2-diphosphonocyclopent-1-ene or a pharmaceutically acceptable salt thereof.

3. The composition of claim 1 wherein the prefluorodiphosphonocycloalkene is 3,3,4,4-tetrafluoro-1,2-diphosphonocyclobut-1-ene or a pharmaceutically acceptable salt thereof.

4. The composition of claim 1 wherein the prefluorodiphosphonocycloalkene is 3,3,4,4,5,5,6,6 - octafluoro-1,2-diphosphonocyclohexe-1-ene or a pharmaceutically acceptable salt thereof.

5. A method for inhibiting deposition and mobilization of calcium phosphate in animal tissue comprising systemically administering an effective but non-toxic amount of a perfluorodiphosphonocycloalkene selected from the group consisting of:

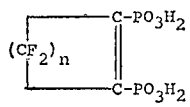

wherein $n$ is an integer from 2 to 4, and the pharmaceutically acceptable salts thereof, and a pharmaceutical carrier to an animal.

6. The method of claim 5 wherein the perfluorodiphosphonocycloalkene is 3,3,4,4,5,5 - hexafluoro - 1,2-diphosphonocyclopent-1-ene or a pharmaceutically acceptable salt thereof.

7. The method of claim 5 wherein the perfluoridophosphonocycloalkene is 3,3,4,4-tetrafluoro-1,2-diphosphonocyclobut-1-ene or a pharmaceutically acceptable salt thereof.

8. The method of claim 5 wherein the perfluorodiphosphonocycloalkene is 3,3,4,4,5,5,6,6 - octafluoro - 1,2-diphosphonocyclohex-1-ene.

9. An animal feed composition comprising a minor proportion of a perfluorodiphosphonocycloalkene selected from the group consisting of:

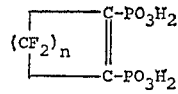

wherein $n$ is an integer from 2 to 4 and the pharmaceutically acceptable salts thereof; and a major proportion of animal feedstock.

10. The composition of claim 9 wherein the perfluorodiphosphonocycloalkene is 3,3,4,4,5,5 - hexafluoro-1,2-diphosphonocyclopent-1-ene or a pharmaceutically acceptable salt thereof.

11. The composition of claim 9 wherein the perfluorodiphosphonocycloalkene is 3,3,4,4-tetrafluoro-1,2-diphosphonocyclobut-1-ene or a pharmaceutically acceptable salt thereof.

12. The composition of claim 9 wherein the perfluorodiphosphonocycloalkene is 3,3,4,4,5,5,6,6 - octafluoro-1,2-diphosphonocyclohex-1-ene or a pharmaceutically acceptable salt thereof.

No reference cited

RICHARD L. HUFF, Primary Examiner